US009833745B2

(12) United States Patent
Goebbert et al.

(10) Patent No.: US 9,833,745 B2
(45) Date of Patent: Dec. 5, 2017

(54) FILTER DEVICE AND A PRODUCTION METHOD

(75) Inventors: Christian Goebbert, Eschau (DE); Manfred Volz, Großrosseln (DE)

(73) Assignee: Nanostone Water GMBH, Halberstadt (DE)

( * ) Notice: Subject to any disclaimer, the term of this patent is extended or adjusted under 35 U.S.C. 154(b) by 732 days.

(21) Appl. No.: 14/238,155

(22) PCT Filed: Aug. 2, 2012

(86) PCT No.: PCT/EP2012/065138
§ 371 (c)(1),
(2), (4) Date: May 30, 2014

(87) PCT Pub. No.: WO2013/020887
PCT Pub. Date: Feb. 14, 2013

(65) Prior Publication Data
US 2014/0251893 A1    Sep. 11, 2014

(30) Foreign Application Priority Data

Aug. 10, 2011 (DE) .................. 10 2011 080 763

(51) Int. Cl.
*B01D 69/04* (2006.01)
*B01D 63/02* (2006.01)
(Continued)

(52) U.S. Cl.
CPC ........... *B01D 69/04* (2013.01); *B01D 63/021* (2013.01); *B01D 63/06* (2013.01); *B01D 63/061* (2013.01);
(Continued)

(58) Field of Classification Search
None
See application file for complete search history.

(56) References Cited

U.S. PATENT DOCUMENTS 661,373 A * 11/1900 Jandus .......................... 210/450
3,339,341 A * 9/1967 Maxwell ................ B01D 63/02
95/53
(Continued)

FOREIGN PATENT DOCUMENTS

CN      101022880       8/2007
DE      2239931 A1      2/1973
(Continued)

OTHER PUBLICATIONS

Japanese Office Action, for JP Application No. 2014-524341, 10 pages, dated Feb. 19, 2016.
(Continued)

*Primary Examiner* — Benjamin Kurtz
(74) *Attorney, Agent, or Firm* — Viksnins Harris Padys Malen LLP

(57) ABSTRACT

The present invention relates to a filtration means (10) for the filtration of liquid media having a housing (12) and at least one filter element (16) arranged in said housing (12), wherein at least one of said filter element (16) at at least one axial end has a laterally outwardly extending flange (24), which is connected to said housing (12) forming a seal. Said flange (24) has a conical surface (25) projecting outwardly which interacts with a complementary conical surface (27) of a gasket (26) which is arranged between said flange (24) and said housing (12).

17 Claims, 9 Drawing Sheets

(51) Int. Cl.
    *B01D 63/06*     (2006.01)
    *B01D 63/08*     (2006.01)
    *B01D 65/00*     (2006.01)

(52) U.S. Cl.
    CPC ............ *B01D 63/08* (2013.01); *B01D 65/003* (2013.01); *B01D 2313/04* (2013.01)

(56) References Cited

U.S. PATENT DOCUMENTS

| | | | |
|---|---|---|---|
| 3,760,949 A | | 9/1973 | Carey et al. |
| 4,265,763 A | * | 5/1981 | Bollinger ............... B01D 53/22 210/321.89 |
| 4,334,993 A | * | 6/1982 | Norton ................. B01D 63/022 165/83 |
| 4,849,104 A | | 7/1989 | Garcera et al. |
| 5,062,910 A | * | 11/1991 | Garcera ................ B01D 29/111 156/245 |
| 5,139,669 A | * | 8/1992 | Clermont ............. B01D 63/02 210/321.8 |
| 5,160,673 A | * | 11/1992 | Wollbeck ............. B01D 63/021 264/45.1 |
| 5,845,386 A | | 12/1998 | Watts |
| 5,904,357 A | * | 5/1999 | Demirdogen .......... B01D 27/08 210/450 |
| 6,096,207 A | | 8/2000 | Hoffman et al. |
| 6,926,827 B2 | | 8/2005 | Gruca et al. |
| 7,588,615 B2 | | 9/2009 | Gillenberg et al. |
| 2006/0070946 A1 | | 4/2006 | Blase et al. |

FOREIGN PATENT DOCUMENTS

| | | |
|---|---|---|
| DE | 69019552 T2 | 9/1995 |
| DE | 19846041 A1 | 4/2000 |
| EP | 0200158 A2 | 11/1986 |
| GB | 1175688 A | 12/1969 |
| JP | S50-016165 A | 2/1975 |
| JP | S61000802 | 1/1986 |
| JP | 02237622 | 9/1990 |
| JP | 2006007165 A | 1/2006 |
| WO | WO 00/53293 A1 | 9/2000 |
| WO | WO 2006/009449 A1 | 1/2006 |

OTHER PUBLICATIONS

Chinese Office Action, for corresponding CN Application No. 201280038909.5, 6 pages, Mar. 3, 2015. [English Translation].

Patent Cooperation Treaty, International Search Report and Written Opinion for PCT/EP2012/065138, 7 pages, Oct. 19, 2012.

Huang, "Pipe Flange Gasket, Fastener Selection Manual", Mechanical Industry Press, 1 page. (Mar. 31, 2006). [With English Translation.].

Japanese Office Action, for corresponding JP Application No. 2014-524341, 5 pages, Oct. 11, 2016.

* cited by examiner

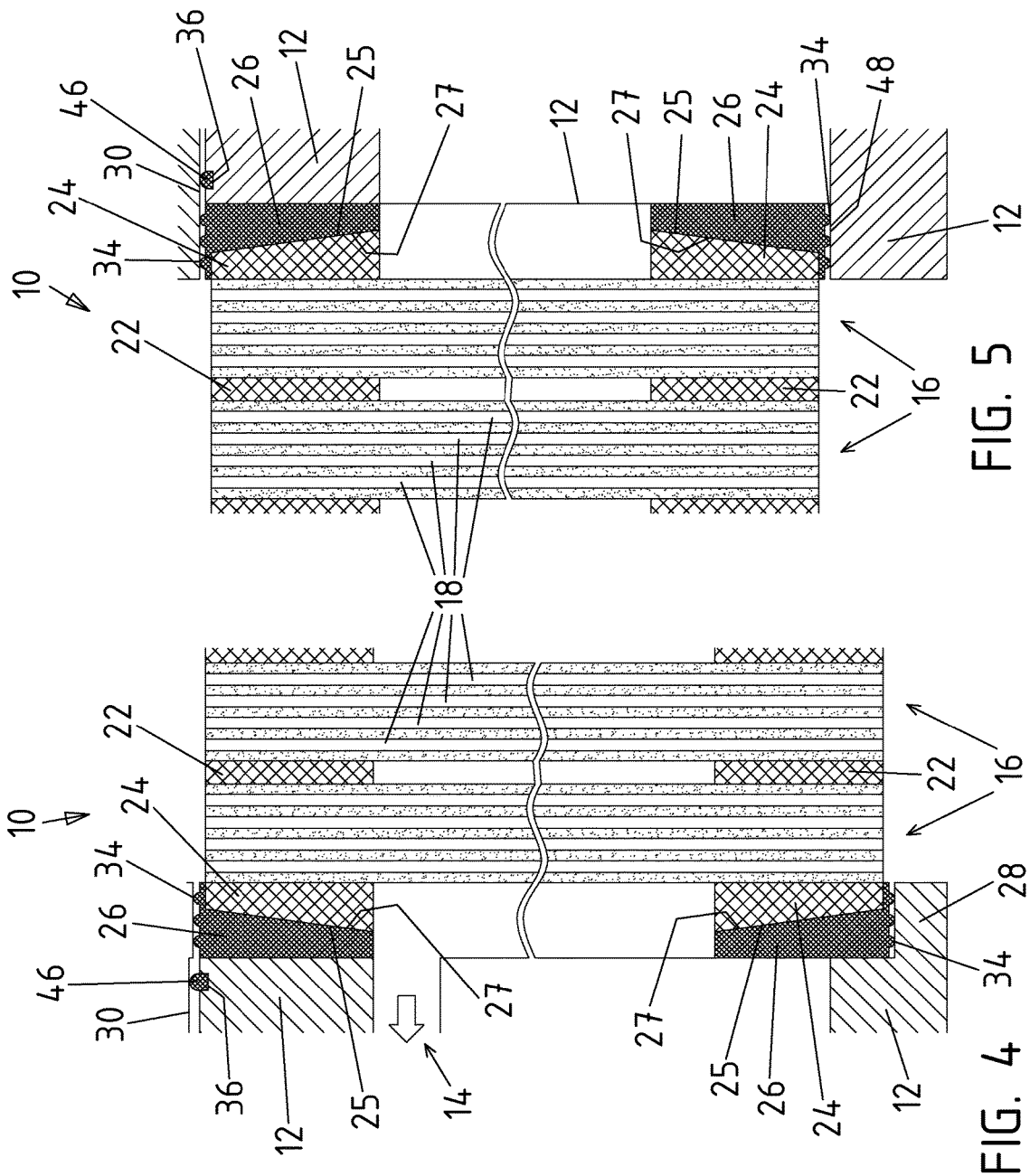

FILTER DEVICE AND A PRODUCTION METHOD

RELATED APPLICATIONS

This application claims priority to German Patent Application Number 102011080763.2 that was filed on Aug. 10, 2011.

The invention relates to a filtration means for the filtration of liquid media according to the preamble of claim 1. In addition, an object of the invention is a process for producing a filtration means for the filtration of liquid media according to the preamble of claim 11.

The invention relates to the field of filtration means formed by membrane modules for the filtration of liquid media, in particular polluted water (so-called unfiltrate). Such a membrane module comprises, for example, at least one elongated filter element, which is traversed by at least one longitudinal channel. It consists of a porous material, for example ceramic. The interior wall of the longitudinal channel is coated with a very thin filter membrane. The membrane module further comprises a housing, preferably made of stainless steel, that surrounds the filter element. On its way through the longitudinal channel, the unfiltrate is purified transverse to the direction of flow by the filter membrane that is applied to the wall surface of the longitudinal channel and exists as a filtrate from the wall surface into a collecting space between the filter elements and the housing. In this context, the housing has to be sealed reliably to the outside at least for liquids.

In the field of water filtration two types of filter elements are known in the prior art. Firstly, there are filter elements having round cross-sections that are referred to as "tubular membranes" and in which the liquid medium is filtered usually from the inside to the outside. The filter membrane is applied in the interior of the longitudinal channels. Secondly, filter elements having rectangular in cross-section are known in the prior known, which are referred to as "flat membranes" and where filtration is performed usually from the outside to the inside. However, filtration in a respective reverse direction of filtration is also known for both types.

In the prior art various embodiments for assembly and sealing of membrane modules can be found. If the filter element consists of a monolith, the monolith is usually machined in the upper and lower portion in such a way that the diameters of the end pieces are slightly smaller than that of the actual body. 0-rings to gasket against the housing of the membrane module are fitted to the machined ends and the monolith, including the 0-ring or alternatively an L-ring is inserted into the module housing.

If the membrane module comprises a molded membrane bundle (i.e. multiple filter elements arranged in parallel), preferably an L-shaped gasket is pre-installed in the module housing, as is well known, into which the entire bundle is inserted precisely fitting. The L-shaped gasket may be first placed on the membrane bundle and then inserted together with the latter into the housing, preferably, however, the gasket is pre-installed in the housing.

For example, WO 2006/009449 A1 shows a membrane module having filter elements, which have at least one end a conically formed ceramic flange, e.g., made of refractory concrete.

DE 690 19 552 T2 shows a membrane module, in which the end portions of the filter elements have an extra thickness with an oblique shoulder, wherein the extra thickness may be made from different materials and the shoulder interacts with different gaskets.

DE 198 46 041 A1 shows a membrane module, in which the end portions of the filter elements are sealed against a housing, for example, by conically formed L-shaped gaskets. The conical surface of the gasket interacts with a complementarily formed surface of a lid of the membrane module.

The object of the present invention is to form a membrane module in such a way that a reliable separation of the filtrate and unfiltrate is ensured even with thermal expansion of different materials and that this can be achieved by a simple installation without damage or slippage of the gasket. In addition, the membrane module is produced in a cost-effective manner.

According to the invention, the object is achieved by a filtration means with the features of claim 1 and a process having the features of the other independent claim. Advantageous refinements are specified in dependent claims.

The present invention is based on the idea to create a new type and mode of action of a sealing for the filtration means. Upon interaction of the conical surface of the flange which is part of said at least one filter element, with the complementarily formed surface of the gasket, the filter element is securely fixed in the housing for operation, and a slippage of the filter element in the housing and damaging the gasket during installation is avoided. In doing so, a reliable separation of the filtrate from the unfiltrate is realized without any possible accumulation by microorganisms. The invention is independent of the use of round or flat membranes as the filter element, as well as independent of the number of filter elements in the housing. The housing and the filter element or filter elements are preferably designed in a circular cylindrical cross-section; however, they can also be configured polygonally.

Preferably, the gasket has an inwardly extending lip portion which covers the flange at least partially. Through this measure, the area of a sealing area between the flange and the gasket is increased, thereby increasing the reliability of the gasket significantly.

In addition, it is advantageous that the flange is formed by a casting compound applied at the end. Here, it is preferably provided for the entire end portion of said at least one filter element or the bundle of filter elements being closed to the outside with the same casting compound during the manufacturing process. In this way, the flange can be produced in a common production step for closing the entire end portion and thereby forms an integral unit with said at least one filter element. The casting material to be applied for this purpose to the end portion of said at least one filter element, for example, in the form of a melt, which cures to form a solid casting compound, comprises a plastic, preferably a polymer, in particular a thermoplastic material. Thermosets or two-component plastics such as epoxies or acrylates are possible also. The above mentioned plastics work reliably, are easy to process and are inexpensive. In addition, all materials of the filtration means mentioned are approved materials for drinking water.

Here, the conically formed surface of the flange can be generated by immersing the end portion of said at least one filter element in a conically formed shape in the casting material during the manufacturing process. Alternatively, it is also possible, of course, that the conical surface is generated subsequently by mechanical machining.

For the invention is also advantageous for the gasket to be impinged by a clamp axially, preferably resiliently. Here, the clamp is preferably formed as a metal plate which, in addition, can be angled. The clamp in the filtration means acts, in particular, amating flange or fixing plate to the gasket, and thus supports the sealing effect. Also, in doing so, the filter element is simply and securely held in the housing.

In order to enhance the sealing effect further, it is additionally possible for a sealing ring to be arranged between the housing and the clamp (which is not mandatory). For this purpose, the housing preferably has a notch, into which the sealing ring is inserted with a portion of its cross-section. The additional sealing effect is produced hereby, for example, an extension of the clamp near the gasket pressurizing the sealing ring inlaid into the notch, and compressing it. Here, the sealing ring is preferably formed as an O-ring; also conceivable are angular formed gaskets or partially angular formed gaskets or flat gaskets, where in using flat gaskets the notch must be adjusted accordingly, or the notch must be omitted entirely.

A further possibility for enhancing the sealing effect is provided in that the clamp and/or a side of the gasket facing the clamp is structured by projections and/or recesses. The recesses can be formed as grooves, for example. The recesses and projections at the gasket serve to compensate for any unevenness of the device, for example. Here also, the clamp is impinged in the axial direction of the filtration means and thereby the projections are partially compressed, so that the sealing effect is produced. In addition, for example, the gasket can be fixed accordingly by to a projection in the clamp and a corresponding recess in the gasket.

A process for manufacturing the filtration device according to the invention provides for the following process steps:

a) applying a plastic casting material around a first end portion of said at least one filter element with which said at least one filter element is encased and generating at the same time said flange that is extending laterally outwardly in the area of the first end portion;

b) curing said casting material;

c) repeating the process steps a) and b) at a second end portion of said at least one filter element thereby generating a second flange that is extending laterally outwardly at said second end portion. Preferably, the flanges of the first and second end portions are formed identically;

d) arranging a first resilient gasket at the inner periphery in the interior of said housing at a first end, which is formed complementary to the conical shape of said first flange on its side facing said first flange. Hereby, the first gasket may have recesses and projections at an exterior surface (transversely to the form of the gasket)

e) pushing said housing together with said first gasket over said at least one filter element, so that said first flange interacts with said conical shape of said first gasket. Hereby, said housing compresses any projections of said first gasket. A perfectly fitting of the housing is prerequisite for the insertion;

f) inserting at a second, opposite end of said housing a second resilient gasket on said second flange, wherein said second gasket is formed complementary to said conical shape of said second flange. Hereby, the second gasket may have recesses and projections at an exterior surface (transversely to the conical form of the gasket);

g) fixing said clamp on the exterior of said housing, wherein said second gasket is impinged by said clamp axially, preferably resiliently. Hereby, any projections of the second gasket are compressed.

In the process according to the invention the production costs are very low. Advantageously, the assembly of the filtration means can be done on location (on site). Also for repair or service purposes, a simple disassembly is possible.

The term "casting material" includes hereby all plastics, which initially are in a substantially liquid phase, for whatever reason, and which subsequently cure, again for whatever reason. Suitable plastics include polymers, thermoplastics, thermosets, two-component plastics such as epoxies or acrylates, and many others.

Further advantages will become apparent from the following description and the enclosed figures. It is understood the above-mentioned features and those to be discussed in the following are used not only in the respective combinations indicated, but also in other combinations or alone, without departing from the scope of the present invention. In the figures FIG. 1 shows a filtration means according to the invention in longitudinal section view;

FIG. 4 shows a more detailed representation of a portion of the embodiment of FIG. 1;

FIG. 5 shows a representation similar to FIG. 4 of a second embodiment with another housing.

Figure 6:
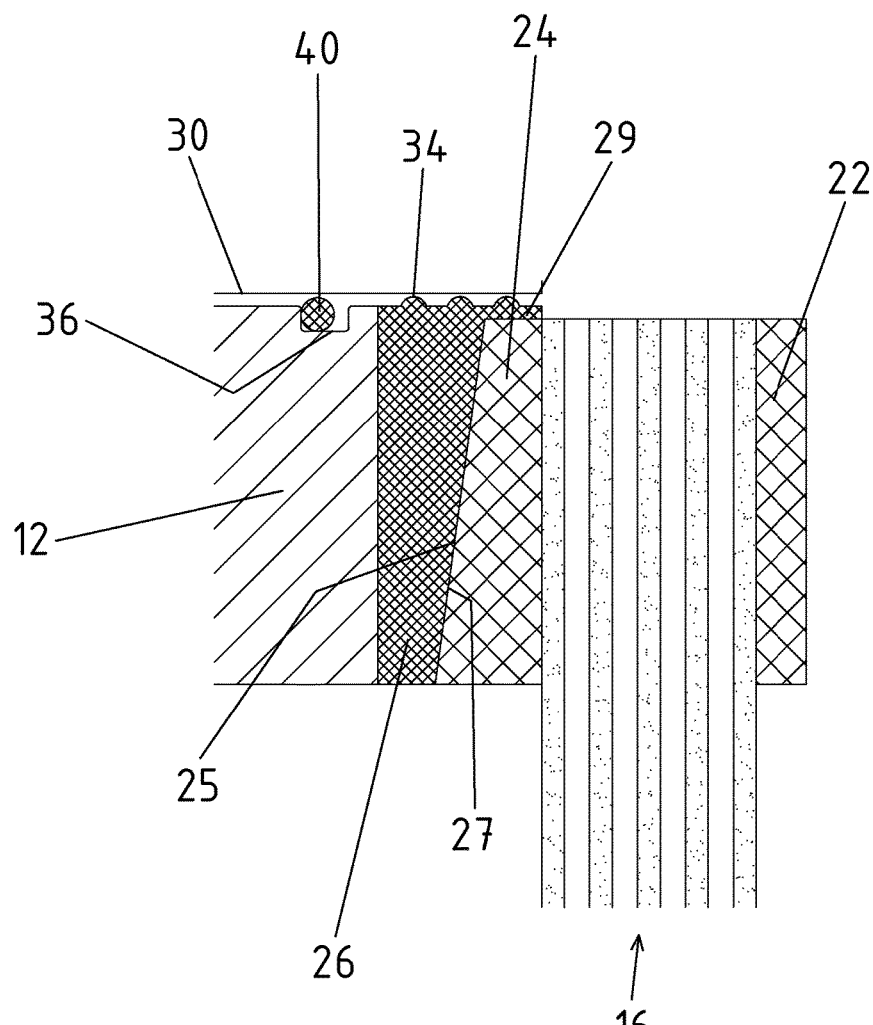

FIG. 6, 10 sectional views through an area of other embodiments of filtration means with different clamps.

Figure 1:
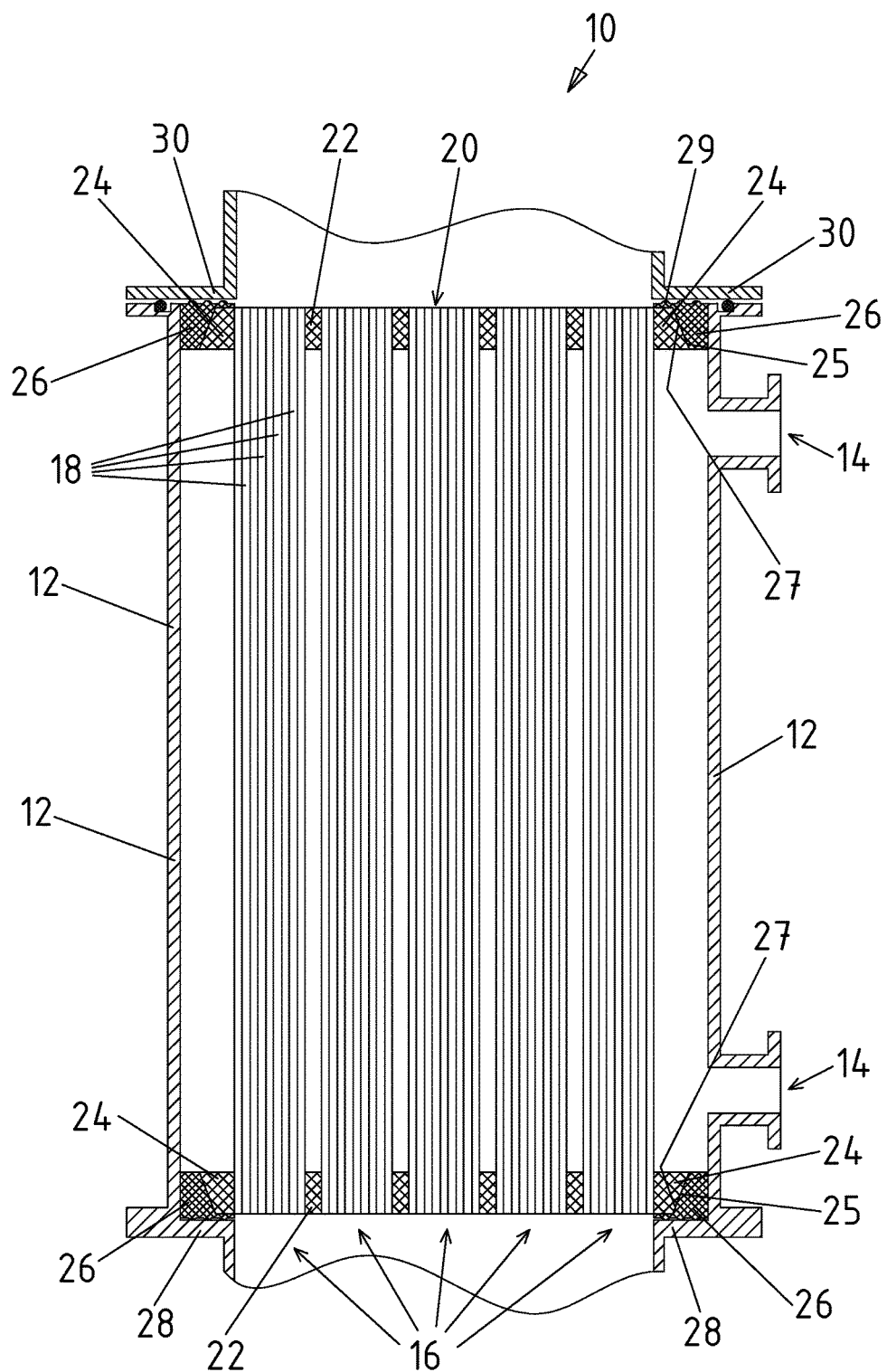

FIG. 1 shows a filtration means 10 according to the invention in longitudinal section view. The filtration means 10 comprises a tubular housing 12 which is preferably made of stainless steel. Two outlet ports 14 are arranged laterally outwardly at housing 12, which are preferably standardized to allow for compatibility to other means.

In housing 12, several elongated filter elements 16 are arranged in the longitudinal extension of housing 12. The filter elements 16 consist of porous material, preferably ceramic, and have longitudinal channels 18 and a filter membrane on the interior surface thereof. The filter elements can be tubular membranes and/or flat membranes. The direction of filtration is preferably from the inside to the outside. This means that the medium to be filtered (unfiltrate) is introduced in one end of each longitudinal channel 18 (see arrow 20). On its way through longitudinal channel 18, the unfiltrate is purified transversely to the direction of flow by the filter membrane that is applied to the wall surface of longitudinal channel 18 (porous material) and exists as a filtrate from the wall surface to the outside (so-called permeation). The interior space of housing 12 has to be sealed reliably to the outside.

For sealing of housing 12 the filter elements 16 in FIG. 1 have a sealing casting material 22 at the lower and upper end portion enclosing filter elements 16. The casting compound 22 is produced from a cured casting material, wherein the casting material consists of a plastic, preferably a polymer, in particular a thermoplastic material. Thermosets or two-component plastics such as epoxies or acrylates are possible also.

At the periphery of the assembly of filter elements 16, the assembly comprises in an extension of casting compound 22, each above and below (in FIG. 1), a flange 24 in the form of a ring-shaped collar that is extending radially outwardly, which consists preferably of the same material as casting compound 22. Thus, flange 24 is an integral part of the filter elements in the interior of housing 12. Both flanges 24 are formed conically oblique on a radially projecting circumferential surface 25 and preferably identical at top and bottom, however, mirror-inverted. Here, the lower diameter is axially outside and the larger diameter is axially inside.

A resilient gasket 26 that is formed complementarily to flange 24 is arranged between the conical circumferential surface 25 of flange 24 and housing 12. That is, it has a radially inner conical or oblique circumferential surface 27, with the smaller diameter axially outside and the larger diameter axially inside. Gasket 26 has a radially inwardly extending lip portion 29 which partially covers flange 24.

In FIG. 1, gasket 26 is pre-installed at the lower end portion on a shoulder 28 of housing 12. At the upper end portion, housing 12 is initially open, so from there, the filter assembly consisting of filter elements and casting compound can be inserted into housing 12. A dimensional accuracy of housing 12 and said filter assembly is a prerequisite.

Following insertion of the filter assembly, gasket 26 is inserted in the upper end portion between flange 24 and housing 12. Then, housing 12 is sealed with a clamp 30 in the area of flange 24 and gasket 26. Clamp 30 is preferably made of a resilient sheet metal which also can be angled. Clamp 30 acts as a fixing plate or as a mating flange and impinges gasket 26 with an axial force. Thus, the interior of housing 12 is protected against a potential penetration of liquid which is not running through longitudinal channels 18. More detailed information on the configuration of the areas of gasket 26 for the improvement or optimization of a sealing effect is provided below.

Figure 2:
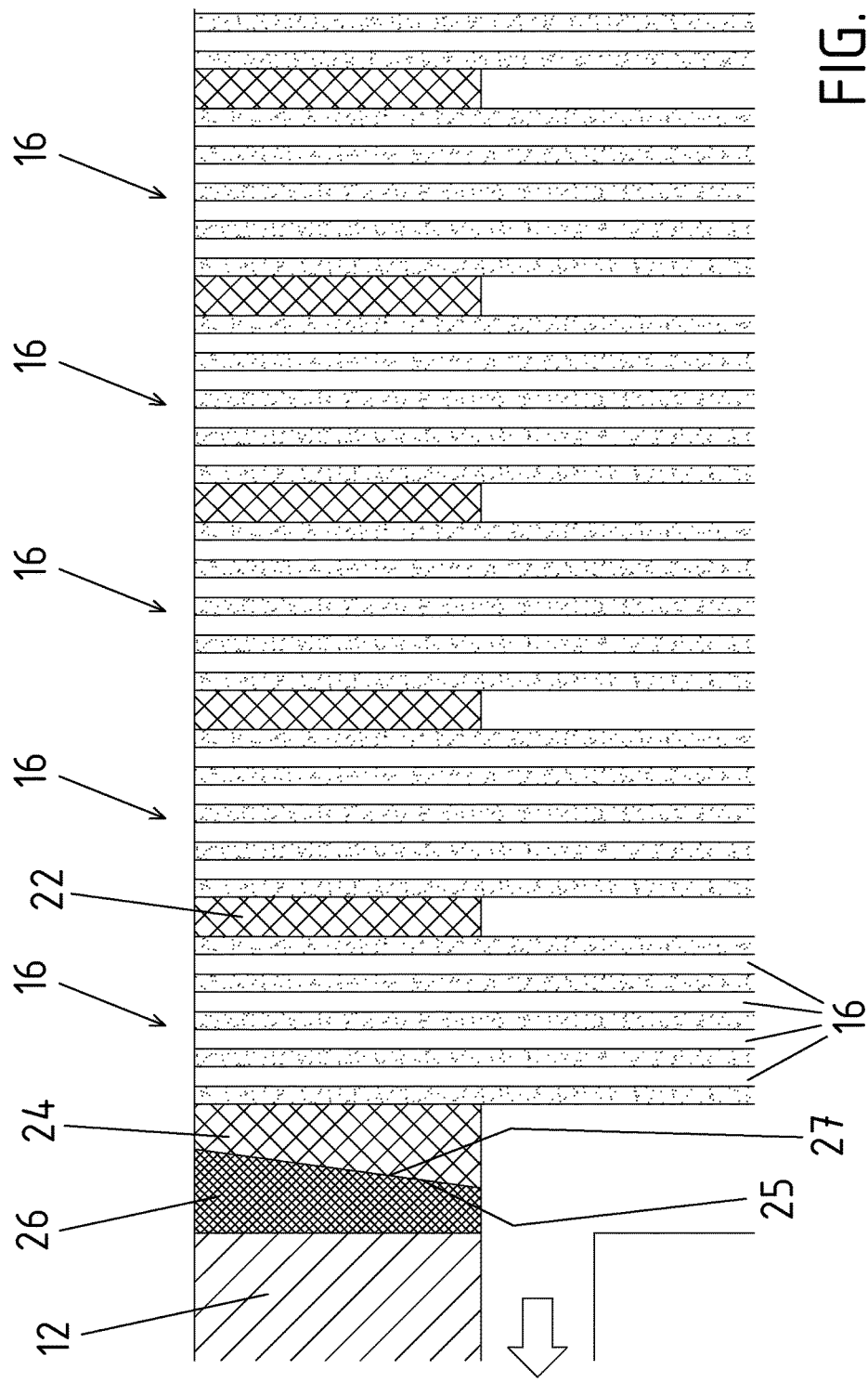
FIG. 2 shows an enlarged longitudinal section through an upper end portion of the filtration means of FIG. 1.

FIG. 2 shows a schematic diagram for explaining the function of the conically formed gasket 26 according to the present invention. All embodiments have in common that in each case the conically formed circumferential surface 25 of flange 24 rests flush on the complementarily formed circumferential surface 27 of gasket 26. Here, preferably, gasket 26 and flange 24 have a same axial extension of the conically formed surfaces 25 and 27. Thus, a gasket area is not formed punctiform as when using an O-ring, rather the sealing area is realized as a surface, which improves the sealing effect. Clamp 30 and shoulder 28 (depending on the upper or lower end portion) pressurize gasket 30 thus creating the actual sealing effect between flange 24 and gasket 26.

Figure 3:
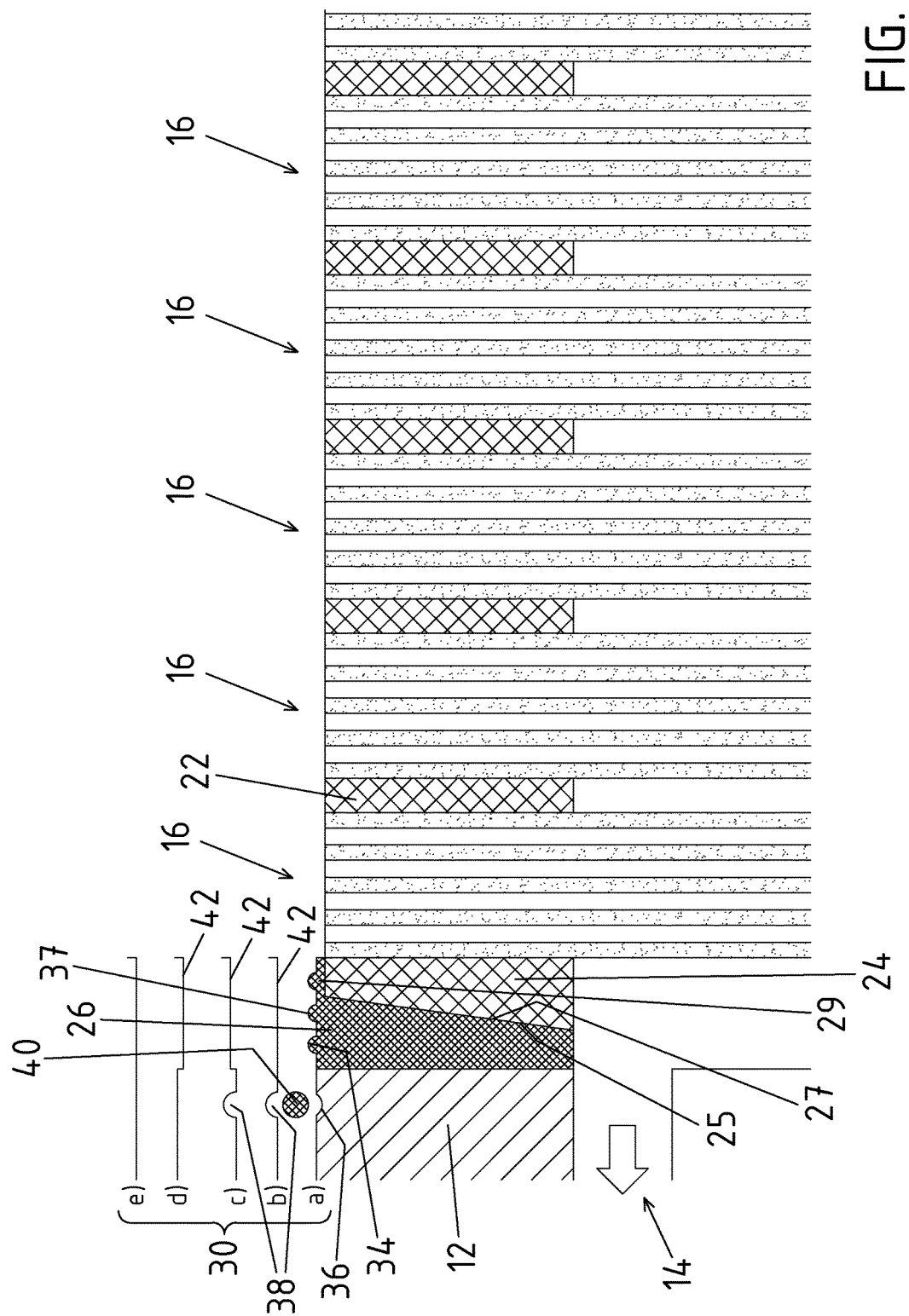
FIG. 3 shows a representation similar to FIG. 2 with different clamps.

FIG. 3 shows the conically formed gasket 26 with five different configurations of clamp 30. The different configurations of FIG. 3 and the following figures can alternatively be selected as needed and serve to adapt the sealing effect of filtration means 10 to individual operating conditions. Clamp 30 partly abuts housing 12 and partly gasket 26 and is secured to housing 12 in a manner not shown in more detail, for example screwed. Gasket 26 in FIG. 3 (and in the following figures) in each case projects beyond flange 24 from the outside radially inwardly. A frontal exterior surface of gasket 26 in this case has ring-like or bulging projections 34 concentric to the longitudinal axis of filtration means 10 with a semicircular cross-section. In addition, housing 12 at its frontal outer surface has a groove 36 that is also concentric to the longitudinal axis of filtration means 10.

In a first embodiment a) of clamp 30, said clamp has grooves 37 that are complementary to projections 34 and in which in the installation position projections 34 are received thereby fixing gasket 26. A corresponding projection of clamp 30 engages with groove 36, which also serves a fixation or centering of clamp 30.

In a second embodiment b) of clamp 30, said clamp has a circumferential groove 38 having an approximate semicircular cross-section at the same height of groove 36 of housing 12, but bulged out oppositely to the latter. Said two grooves 36, 38 thus form in the installation position a circumferential receiving space having an approximate circular cross-section into which an O-ring 40 is inserted. A flat surface 42 of clamp 30 abuts projections 34.

In a third embodiment c) of clamp 30, flat surface 42 is axially offset outwardly in comparison with embodiment b).

In a fourth embodiment d) of clamp 30, flat surface 42 is axially offset inwardly (toward gasket 26) in comparison with embodiment b. The use of an O-ring is not necessarily provided for, thus a corresponding circumferential groove is missing. Even in this embodiment it is possible to use an O-ring and to compress it simply between the flat surfaces of clamp and housing in a manner so that it exerts a sealing effect.

In a fifth embodiment e) of clamp 30 the entire surface of clamp 30 is not structured rather formed flat and thus represents the simplest form of clamp 30.

FIGS. 4 and 5 show options for the configuration of the area of gasket 26 in the upper and in the lower end portion of filtration means 10. In FIG. 4, the filter assembly comprising filter elements 16 and flanges 26 is inserted in the lower end portion in one stage of housing 12, gasket 26 rests axially on shoulder 28 of housing 12 with a bottom side formed with protrusions 34. At the upper end portion also, the gasket has projections 34 axially outwardly or upwardly, which abut clamp 30 according embodiment d) of FIG. 3. In addition, a sealing ring 46 is inserted with its angularly formed lower side in a circumferential groove 36 having a rectangular cross-section and abuts the planarly formed portion 42 of clamp 30 with its circular-shaped upper side. Resiliently formed clamp 30 impinges projections 34 and sealing ring 46 with an axial compressive force.

In FIG. 5, the filter assembly comprising filter elements 16 and flanges 26 in the lower end portion is placed flat of a portion 48 of housing 12 at an edge; gasket 26 lies with an axial front side that is formed with projections 34, on the flat portion 48 of housing 12. In addition, sealing ring 46 is inserted with its angularly formed lower side in groove 36 of housing 12 and abuts the planarly formed clamp 30 with its circular-shaped upper side. Resiliently formed clamp 30 impinges projections 34 and sealing ring 46 with an axial compressive force.

FIGS. 6 to 10 show further options for the configuration of gasket 26 with clamp 30. In FIGS. 6 to 10, in each case, gasket 26 has bulging, circumferential projections 34 that are axial and concentric to the longitudinal axis of filtration means 10 at an axial exterior surface (facing clamp 30).

In FIG. 6, housing 12 comprises groove 36 with rectangular cross-section into which O-ring 40 is inserted with some clearance. The planarly formed clamp 30 (according to embodiment e) of FIG. 3) abuts O-ring 40 and projections 34. Resiliently formed clamp 30 impinges projections 34 and O-ring 40 with an axial compressive force.

Figure 7:
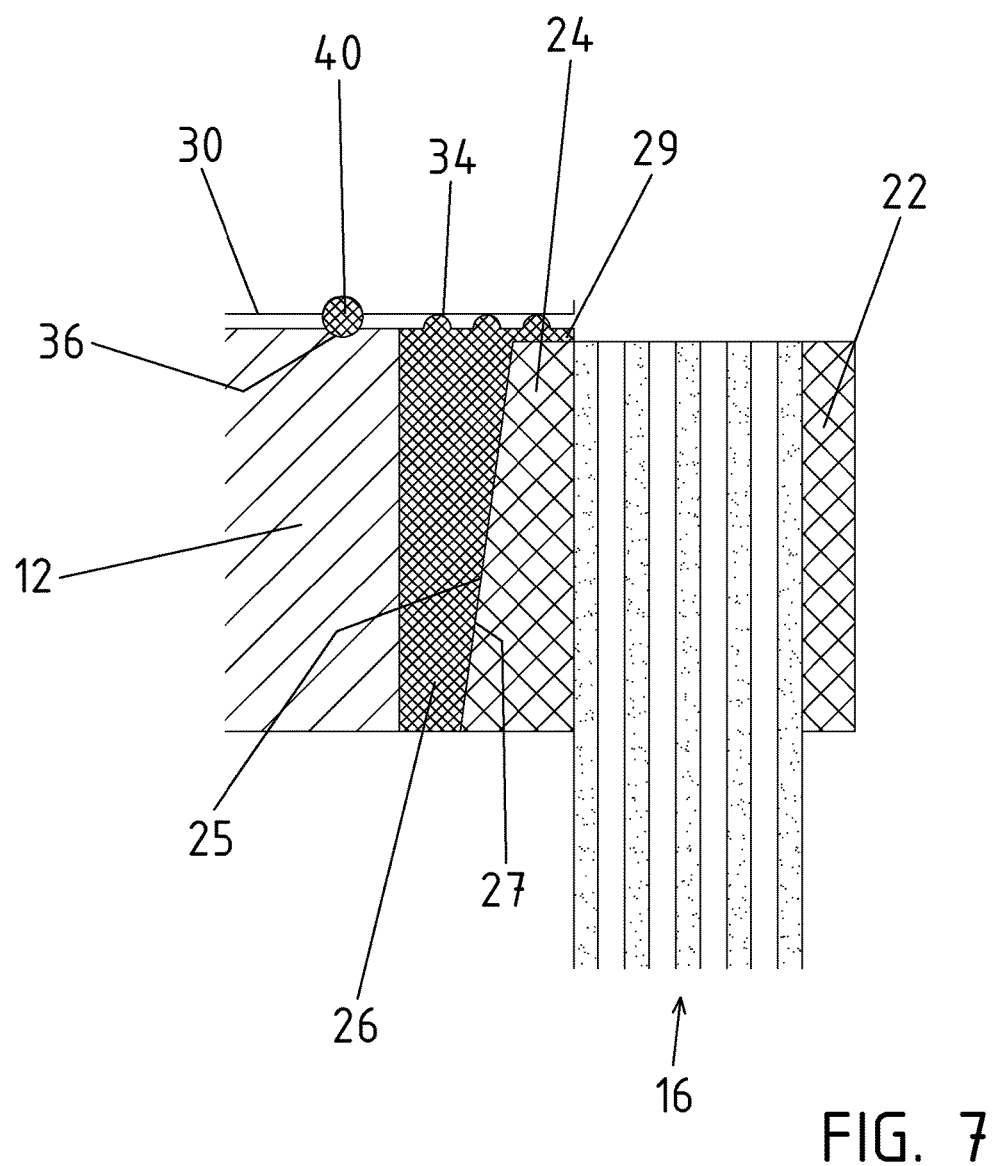
FIGS. 7-9 show section views through an area of the filtration means in accordance with one or more embodiments.

In FIG. 7, housing 12 comprises groove 36 having a semicircular cross-section and clamp 30, and opposite groove 38, into which O-ring 40 is inserted. Clamp 30 according to embodiment c) of FIG. 3 abuts O-ring 40 and projections 34. Resiliently formed clamp 30 impinges projections 34 and O-ring 40 with an axial compressive force.

Figure 8:
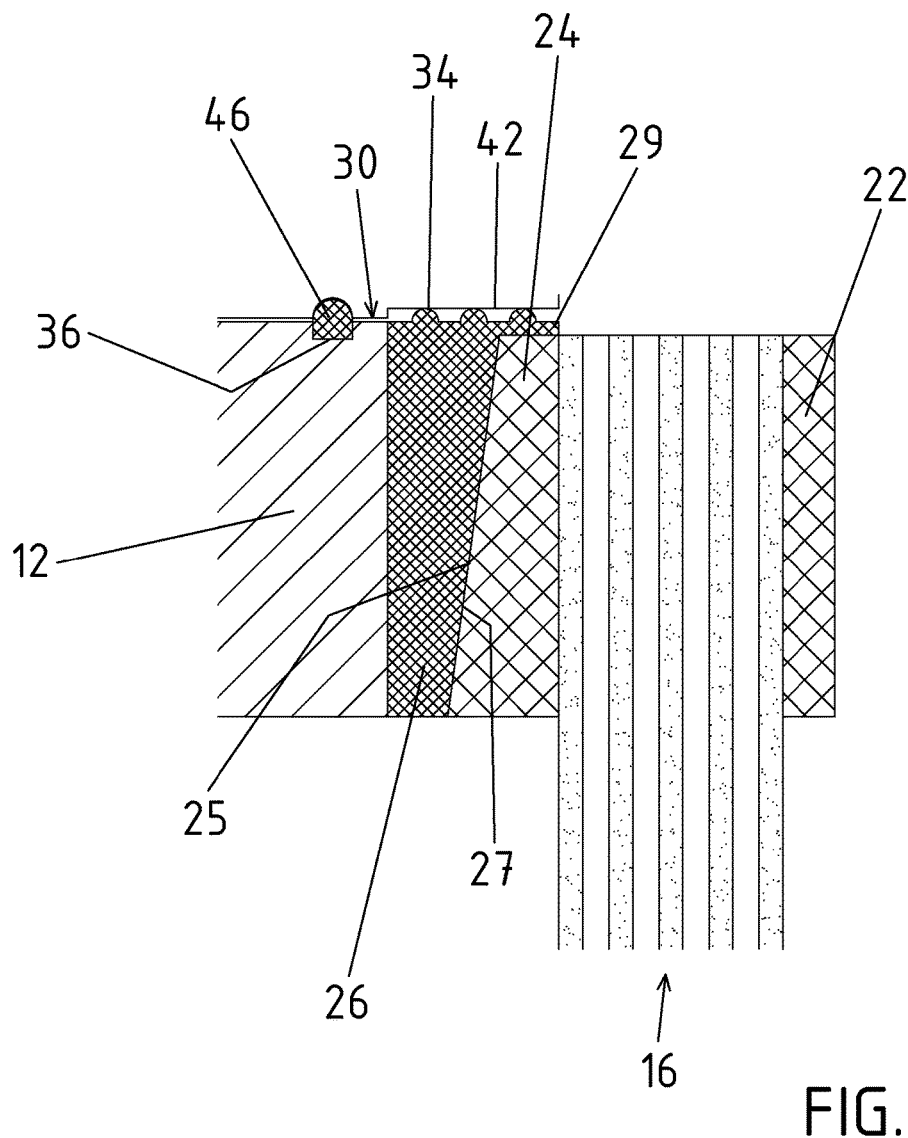

In FIG. 8, housing 12 comprises groove 36 having a rectangular cross-section into which sealing ring 46 is inserted with its angularly shaped lower side. Clamp 30 according to embodiment c) of FIG. 3 abuts the circular upper portion of sealing ring 46 and projections 34 with the axially outwardly offset surface 42. Resiliently formed clamp 30 impinges projections 34 and sealing ring 46 with an axial compressive force.

Figure 9:
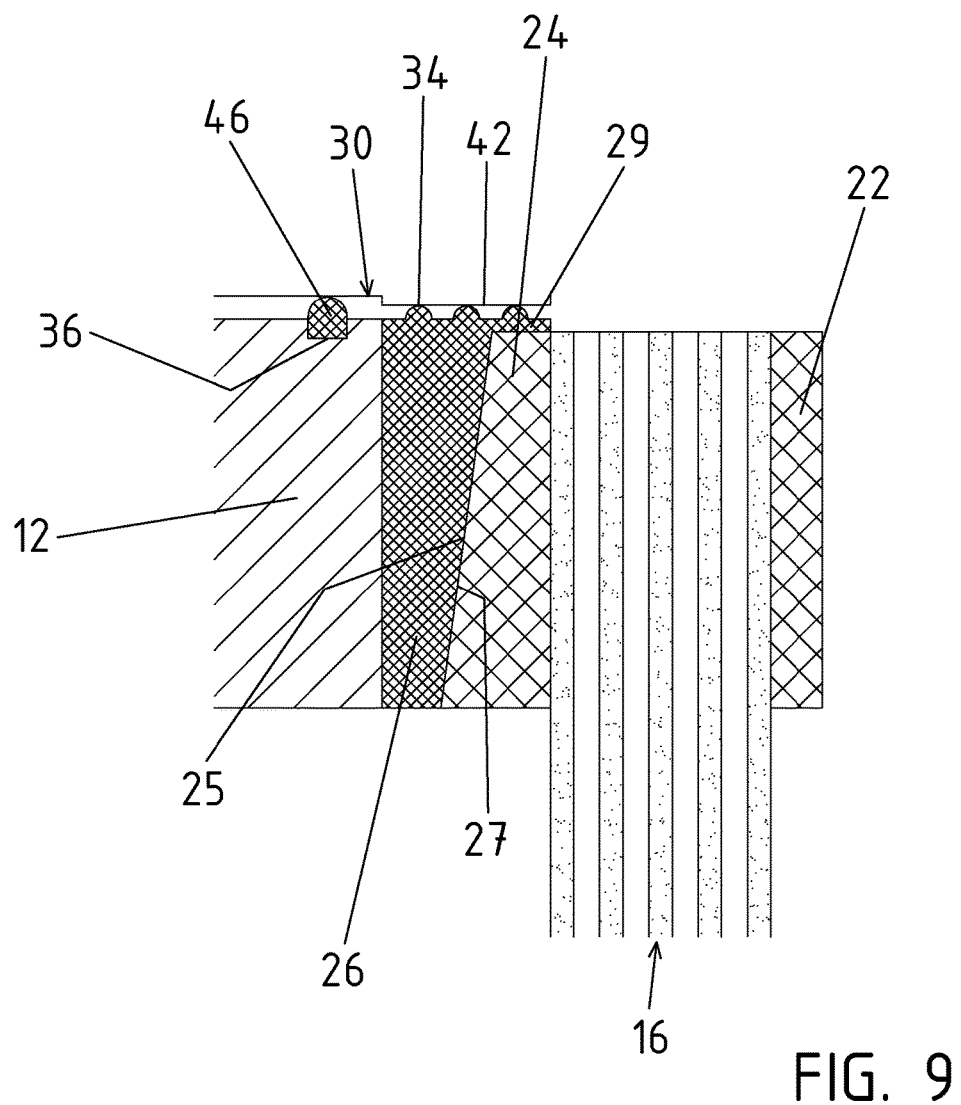

In FIG. 9, housing 12 comprises groove 36 having a rectangular cross-section into which sealing ring 46 is inserted with its angularly shaped side. Clamp 30 according to embodiment d) of FIG. 3 abuts the circular portion of sealing ring 46 and projections 34 with the inwardly offset surface 42. Resiliently formed clamp 30 impinges projections 34 and sealing ring 46 with an axial compressive force.

Figure 10:
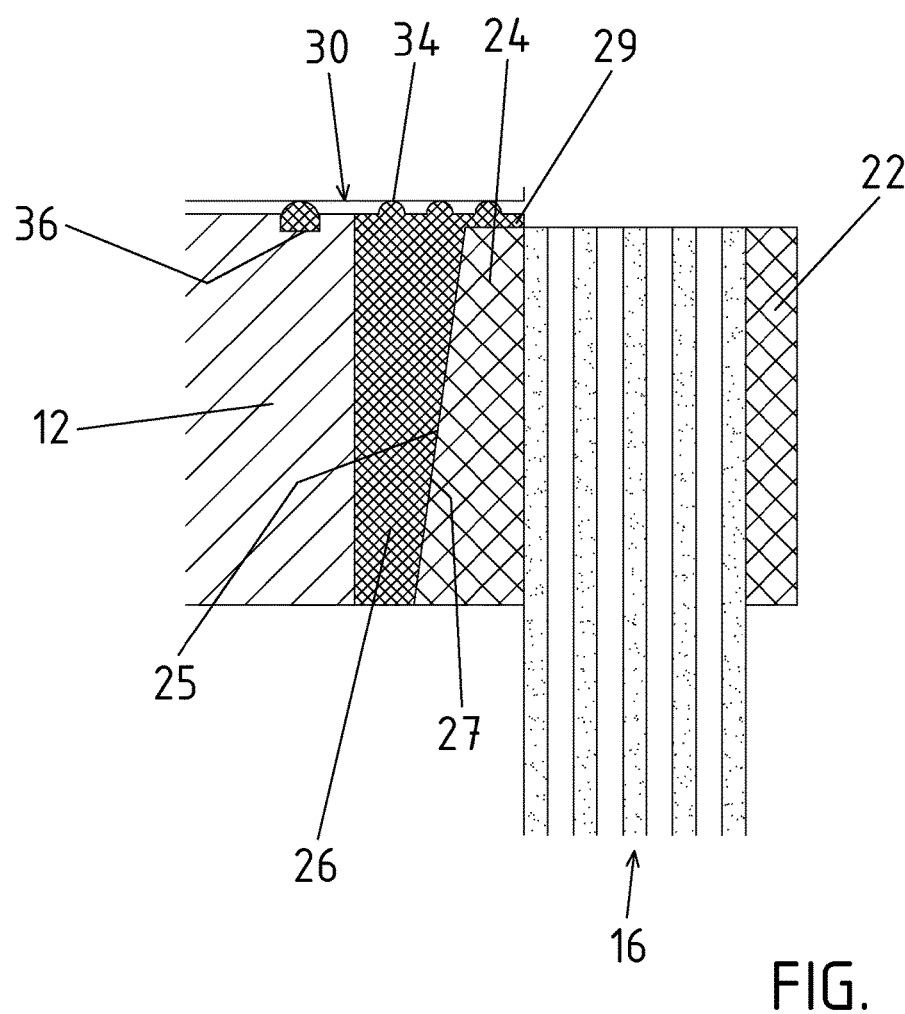

In FIG. 10, housing 12 comprises groove 36 having a rectangular cross-section into which sealing ring 46 is inserted with its angularly shaped lower side. Planarly formed clamp 30 according to embodiment e) of FIG. 3 abuts the circular upper portion of sealing ring 46 and projections 34. Resiliently formed clamp 30 impinges projections 34 and sealing ring 46 with an axial compressive force.

Filtration means 10 according to the invention can be produced inexpensively by a production process described in the first part of the document. Here, the assembly can be done also on location (on site). The choice of the appropriate embodiment or configuration of the area of gasket 26 can be determined by current conditions on location.

The invention claimed is:

1. A filtration means for the filtration of liquid media, comprising:
   a housing;
   at least one filter element arranged in said housing;
   a first laterally outwardly extending flange formed at a first axial end of the filter element, the first laterally outwardly extending flange is connected to said housing forming a seal;
   a second laterally outwardly extending flange formed at a second axial end of the filter element, the second laterally outwardly extending flange is connected to said housing forming a seal;
   a first elastic gasket arranged between the first laterally outwardly extending flange and the housing so as to not fixedly attach to the first flange; and
   a second elastic gasket arranged between the second laterally outwardly extending flange and the housing so as to not fixedly attach to the second flange;
   wherein said first and second laterally outwardly extending flanges are formed by a casting compound applied at the first and second axial end, wherein an outer peripheral surface of each of the first and the second laterally outwardly extending flanges is formed into a conical surface, a smaller diameter portion of which is located outside along an axial direction and a larger diameter portion of which is located inside along the axial direction and wherein an inner peripheral surface of each of the first and the second laterally outwardly extending flanges is cylindrical;
   wherein in an unloaded state of the first and second elastic gasket, the first and second elastic gasket have a gasket conical surface at a gasket inner peripheral surface of each of the first and the second elastic gaskets, a gasket smaller diameter portion of which is located outside along a gasket axial direction and a gasket larger diameter portion of which is located inside along the gasket axial direction and complementary to the outer peripheral surface of each of the first and the second laterally outwardly extending flanges.

2. The filtration means according to claim 1, wherein said gasket has an inwardly extending lip portion which covers said flange at least partially.

3. The filtration means according to claim 1, wherein said gasket is impinged by a clamp axially.

4. The filtration means according to claim 3, wherein a sealing ring is arranged between said housing and said clamp.

5. The filtration means according to claim 4, wherein the sealing ring is an O-ring.

6. The filtration means according to claim 3, wherein said clamp or a side of said gasket facing said clamp is structured by projections.

7. The filtration means according to claim 1, wherein said filter element has a circular cross-section.

8. The filtration means according to claim 1, wherein said filter element and/or said housing have a polygonal cross-section.

9. The filtration means according to claim 1, wherein said filter element comprises round or flat membranes.

10. A process for manufacturing a filtration device according to claim 1, comprising:
    a) applying a plastic casting compound around said first axial end of the filter element with which said filter element is encased and generating at the same time said first laterally outwardly extending flange at the first axial end of the filter element; b) curing said casting compound; c) repeating a) and b) at said second axial end of the filter element thereby generating said second laterally outwardly extending flange at said second axial end of the filter element; d) arranging said first elastic gasket at an inner periphery in an interior of said housing at a first end, which is formed complementary to the outer peripheral conical surface of said first laterally outwardly extending flange on its side facing said first laterally outwardly extending flange; e) pushing said housing together with said first elastic gasket over the filter element, so that said outer peripheral conical surface of said first laterally outwardly extending flange interacts with said conical surface of said first elastic gasket; f) inserting at a second, opposite end of said housing said second elastic gasket on said second laterally outwardly extending flange, wherein said second elastic gasket is formed complementary to said outer peripheral conical surface of said second laterally outwardly extending flange on its side facing said second laterally outwardly extending flange; g) fixing a clamp on the exterior of said housing, wherein said second elastic gasket is impinged by said clamp axially.

11. The process according to claim 10, wherein at least one of said first and second axial ends of said filter element is immersed into the still liquid casting material to form the outer peripheral surface of said at least one first and second axial ends of said filter element into said conical surface.

12. The process according to claim 10, wherein at least one of the first and second laterally outwardly extending flanges is machined mechanically afterwards to generate said outer peripheral surface into said conical surface.

13. The filtration means according to claim 3, wherein the clamp and a side of said gasket facing said clamp is structured by recesses.

14. The filtration means according to claim 3, wherein the clamp and a side of said gasket facing said clamp is structured by projections and recesses.

15. The filtration means according to claim 4, wherein the housing has a notch, and at least a portion of the sealing ring is disposed in the notch.

16. The filtration means according to claim 3, wherein the clamp has grooves and the gasket has projections, where the grooves receive the projections therein.

17. The filtration means according to claim 16, wherein the projections are circumferential to the gasket, and are concentric relative to a longitudinal axis of the filtration means.

\* \* \* \* \*